United States Patent [19]

Tou

[11] Patent Number: 4,791,291

[45] Date of Patent: Dec. 13, 1988

[54] MASS SPECTROMETER SAMPLING SYSTEM FOR A LIQUID STREAM

[75] Inventor: James C. Tou, Midland, Mich.

[73] Assignee: The Dow Chemical Company, Midland, Mich.

[21] Appl. No.: 885,362

[22] Filed: Jul. 14, 1986

[51] Int. Cl.[4] .............................................. B01D 59/44

[52] U.S. Cl. .................................... 250/288; 250/281; 250/282

[58] Field of Search ................... 250/288, 288 A, 281, 250/282

[56] References Cited

U.S. PATENT DOCUMENTS

| | | | |
|---|---|---|---|
| Re. 26,392 | 5/1968 | Craig et al. . | |
| 2,412,236 | 12/1946 | Washburn | 250/282 |
| 2,569,032 | 9/1951 | Washburn . | |
| 2,618,750 | 11/1952 | Parsegian et al. . | |
| 2,721,270 | 10/1955 | Bennett . | |
| 2,767,319 | 10/1956 | Beeton et al. . | |
| 2,775,707 | 12/1956 | Benapfl . | |
| 3,076,893 | 2/1963 | Damoth et al. . | |
| 3,176,128 | 3/1965 | Ehrhardt et al. . | |
| 3,195,355 | 7/1965 | Boyer et al. . | |
| 3,270,773 | 9/1966 | Brunnee . | |
| 3,431,451 | 3/1969 | Brunnee et al. . | |
| 3,440,417 | 4/1969 | Heath . | |
| 3,449,563 | 6/1969 | Brown . | |
| 3,500,040 | 3/1970 | Padrta . | |
| 3,590,243 | 6/1971 | Perrin et al. . | |
| 3,594,574 | 7/1971 | Morgan et al. . | |
| 3,673,405 | 6/1972 | Moorman et al. . | |
| 3,712,111 | 1/1973 | Llewellyn . | |
| 3,742,213 | 6/1973 | Cohen et al. | 250/282 |
| 3,791,106 | 2/1974 | Haley . | |
| 3,835,019 | 9/1974 | Lovelock . | |
| 3,858,435 | 1/1975 | Stevens . | |
| 3,895,231 | 7/1975 | Sodal et al. . | |
| 3,933,047 | 1/1976 | Fowler . | |
| 3,943,363 | 3/1976 | Amblard | 250/288 |
| 4,008,388 | 2/1977 | McLafferty et al. | 250/288 |
| 4,018,241 | 4/1977 | Sodal et al. . | |
| 4,201,913 | 5/1980 | Bursack et al. . | |
| 4,213,326 | 7/1980 | Brodasky . | |
| 4,214,158 | 7/1980 | Schmidt . | |
| 4,259,573 | 3/1981 | Prober et al. . | |
| 4,298,795 | 11/1981 | Takeuchi et al. | 250/288 |
| 4,314,156 | 2/1982 | Kuppermann et al. . | |
| 4,405,860 | 9/1983 | Brunnee et al. . | |
| 4,411,575 | 10/1983 | Miller . | |
| 4,468,948 | 9/1984 | Nakayama . | |
| 4,495,414 | 1/1985 | Barrie et al. . | |
| 4,501,965 | 2/1985 | Douglas . | |
| 4,542,293 | 9/1985 | Fenn et al. . | |
| 4,551,624 | 11/1985 | Spangler et al. | 250/287 |
| 4,562,351 | 12/1985 | Atherton et al. . | |
| 4,629,478 | 12/1986 | Browner et al. | 250/288 |

OTHER PUBLICATIONS

"Estimation of Extra-Column Dead Volume Effects Using a Mixing Cell Model," by C. H. Lochmuller and M. Sumner, Journal of Chromatographic Science, vol. 18, Apr. 1980, pp. 159-165.

"Exponential Dilution as a Calibration Technique," by J. J. Ritter and N. K. Adams, Analytical Chemistry, vol. 48, No. 3, Mar. 1976, pp. 612-619.

*Primary Examiner*—Bruce C. Anderson
*Assistant Examiner*—Paul A. Guss

[57] ABSTRACT

This invention relates to several improvements in mass spectrometric analysis. In accordance with one aspect of this invention, a mass spectrometer sampling system is provided in which a continuous flowing liquid stream can be sampled into a carrier gas stream where it is heated and vaporized. The gas and vapor mixture is transmitted into a plurality of chambers connected in series which have the effects of diluting the concentration of the vaporized liquid injected into the inert gas streams and also shaping the concentration time profile at the exit of the last chamber to be a symmetric peak. These effects have been found to provide several advantages such as prolonging the instrument operation time, and allowing a faster sample injection rate. Once the mixture has exited the last of the chambers, a molecular leak is provided to reduce the pressure to that necessary for the operation of the mass spectrometer. A series of chambers in accordance with this invention has also been found to enable very thorough mixing of reagents.

20 Claims, 5 Drawing Sheets

MASS SPECTROMETER SAMPLING SYSTEM FOR A LIQUID STREAM

BACKGROUND OF THE INVENTION

This invention relates to a mass spectrometer sampling system and more particularly to a means for introducing small quantities of liquid from a continuous flowing stream into the high vacuum environment necessary in conjunction with mass spectroscopic analysis. This invention further relates to a means for thorough mixing of gas streams or vaporized liquid streams.

Mass spectrometers are devices used in pure and applied sciences as a means of identifying the existence of particular elements and compounds. The device enables such identification though the precise measurement of atomic masses. Gas or vapor to be characterized flows into a continuously pumped vacuum chamber at such a rate as to enable the chamber to be maintained at an extremely low pressure. Typical operation of such devices requires vacuums on the order of $10^{-8}$ to $10^{-6}$ torrs (mm of mercury). Molecules of the substance to be characterized are bombarded by an electron beam, typically emitted by a heated tungsten filament. Electrons of the beam collide with molecules of the substance to be characterized and strip off electrons, thus generating positively charged ions. These positively charged ions are accelerated across a series of charged plates. The ion beam is then directed to pass through a magnetic field which is oriented to deflect the beam. The extent to which the ion beam is deflected by the magnetic field depends on both the charhge and mass of the ion particles. The greater the charge of the ion, the greater its deflection. The deflection of an ion is further inversely related to its mass. In practice, the excitation of the electromagnet which provides the deflecting magnetic field is modulated and the ions are detected with either a collector plate or an electron multiplier.

Although various designs of mass spectrometer sampling systems for a liquid stream have been employed in the past, a continued problem faced by designers and users of such systems relates to the difficulty of reducing the pressure of the substance to be characterized from a relatively high pressure to the extremely low operating pressures of the system. In accordance with one experimental laboratory method, samples are periodically taken from a liquid stream by a piston-type pump designed to displace a very small volume of liquid. The outlet side of the pump is at a low pressure, typically about one torr. This low vacuum is reduced still further to that necessary for operation of the mass spectrometer through the use of a molecular leak, which provides an extremely high restriction to the flow of the vaporized liquid, thus enabling the necessary reduction in pressure. After a sample is taken, the system must be evacuated to permit the introcuction of a second sample. This process is laborious. More importantly, however, present day sampling pumps invariably possess a measurable degree of leakage due to the great pressure difference acting across the pump seals. Consequently, the purity of the sample is disturbed. Additionally, since a vacuum pump must be operated to provide the necessary low vacuum, there is a tendency for the samples to accumulate within the pumping system.

Another laboratory approach toward reducing the pressure of a substance to be characterized for mass spectroscopic study involves the use of a needle valve within a liquid stream which controls the flow of the liquid into a high vacuum chamber. Additional pressure reduction is provided through a molecular leak, such as described above. The disadvantages associated with this system includes those described above. Further, this system type suffers from a tendency for the needle valve to plug.

In addition to addressing the above-mentioned shortcomings of prior art sampling systems, there is a further need to provide a sampling device which enables the sampling of substances during a reaction process for real time analysis. It is further desirable for such a system to be mechanically simple as well as to be entirely closed such that toxic substances not being sampled into a mass spectrometer can be trapped or destroyed before venting.

The improved sampling system for a mass spectrometer device in accordance with this invention provides the above-mentioned desirable features. The system injects a liquid sample into an inert gas stream such as Helium at atmospheric pressure. Upon injection, the liquid is heated to cause it to vaporize and the vapor is carried by the inert gas stream into a plurality of isolated volumes connected in series. These volumes have the effect of diluting the concentration of the vaporized liquid injected into the inert gas stream and also shaping the concentration time profile at the exit of the last chamber to be a symmetric peak. At the conclusion of the sample flow path, a molecular leak or a membrane probe is provided which enables a small amount of the injected vaporized liquid to be introduced into the spectrometer ionized section. One significant advantage of the improved sampling system is that pump leakage is eliminated since the pump is not operating across a high pressure differential. Also, the pump does not have plugging problems since the piston moves into and out of the liquid flow stream such that impurities are flushed away. Additionally, a vacuum pump is not required which makes the system to be mechanically simple. Furthermore, the inert gas stream serves the purpose of continuously clean the walls of the sample volumes as well as the mass spectrometer ion source. The provision of the plurality of isolated volumes enables the concentration of the sample being characterized to be predicted accurately with respect to time.

When conducting mass spectrometric studies which involves the evaluation of a reaction employing gas or vapor reagents, problems have been presented due to poor mixing of the reagents. Inadequate mixing results in erratic reaction progression. In accordance with another aspect of this invention, a series of discrete volumes are employed within the inlet portion of a chemical reactor which thoroughly mixes the reagents prior to introduction into the reactor.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
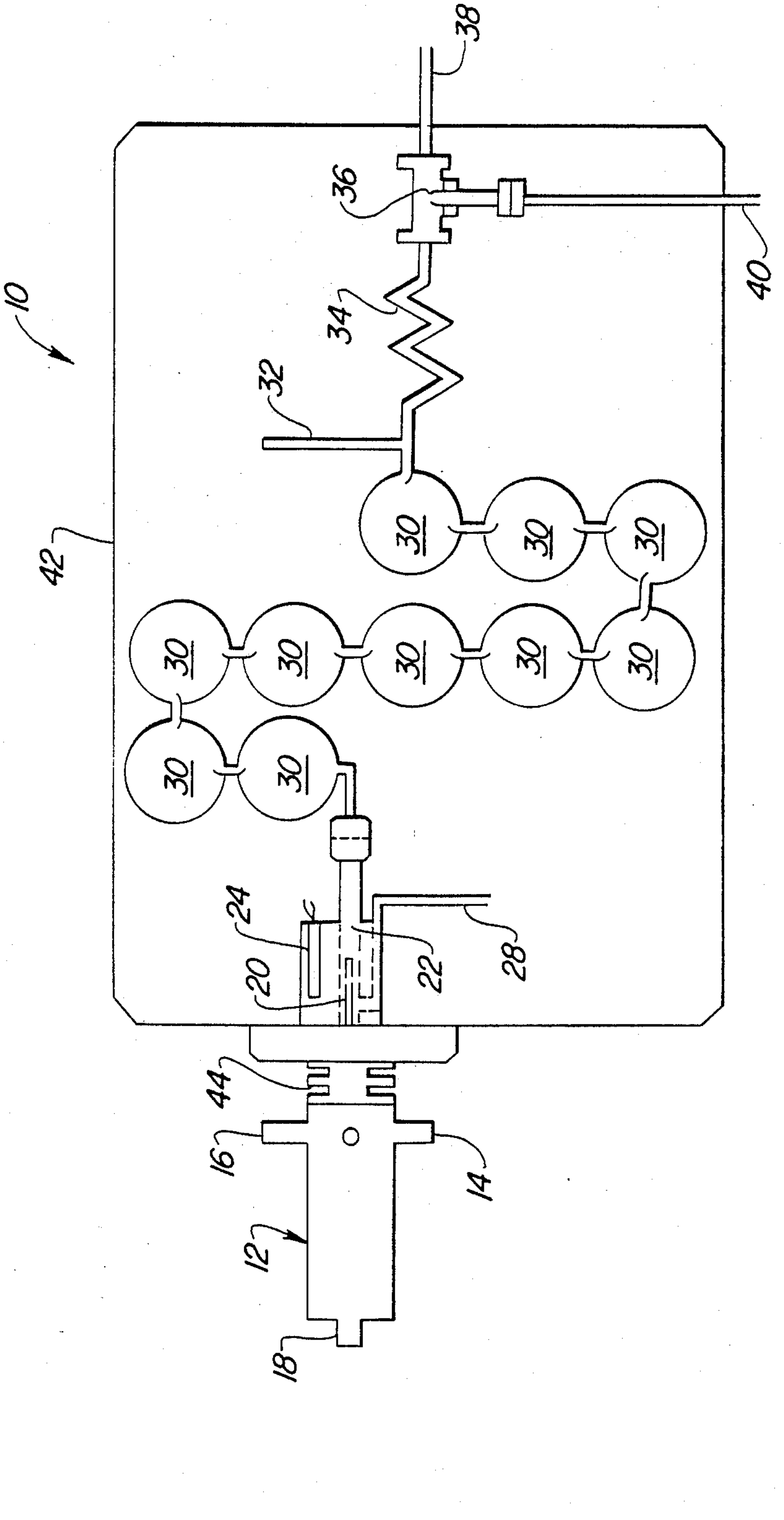
FIG. 1 is a schematic diagram of a mass spectrometer sampling system according to this invention.

FIG. 1 illustrates a mass spectrometer sampling apparatus in accordance with this invention which is generally designated by reference number 10. Injection valve assembly 12 is employed to periodically inject small quantities of sample liquid which flows into port 14 and out of port 16. In one embodiment according to the present invention, the standard Bendix liquid sample valve is used as the injection valve assembly 12 in the practice of this invention. However, it should be appreciated that other suitable valves may be used in the appropriate application. Valve assembly 12 includes an air actuator port 18 to enable periodically cycling of valve 12 using an air pressure signal. Injector rod 20 has a notched outer surface which causes small quantities of the liquid or other fluid being characterized to be deposited within cavity 22. Cartridge heater 24 is employed to vaporize the sample. A carrier gas is introduced into inlet 28 and mixed with the sample. It is preferred that an inert gas such as helium or argon be used for the carrier gas, with helium being the most preferred. The mixture of sample and carrier gas passes through a plurality (ten shown) of generally globe-shaped glass chambers 30 with nipple-shaped protrusions in the inlet and outlet of each chamber to promote turbulent flow. Chambers 30 are connected by relatively small diameter conduits 31. The advantages of providing a plurality of chambers 30 will be explained hereinafter. If it is desired to reduced the concentration of the substance being characterized, an auxiliary flow of carrier gas may be introduced into inlet 32. Thereafter, the mixture passes through a spirally wound mixing column 34 where it reaches quartz molecular leak 36, having vent outlet 38 and high vacuum outlet 40. Material from high vacuum outlet 40 is the sample source for the remainder of the mass spectrometer device (not shown). As shown, most of the elements of sampling apparatus 10 are enclosed within a temperature controlled oven 42. Each of the gas conveying conduits of the sampling system which are in the oven 42 may be spirally wound in order to increase the resident time of these gases in the oven, and thereby further stabilize the temperature. Radiator 44 is provided as a thermal insulator to prevent temperature build-up of injection valve assembly 12. During operation, there is no appreciable leakage across valve assembly 12 since the carrier gas is at or near atmospheric pressure.

Figure 2:
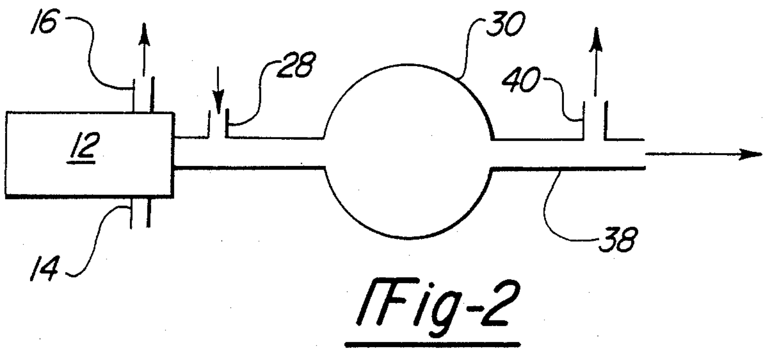
FIG. 2 is a simplified diagrammatic view of a mass spectrometer sampling system according to this invention which employs a single chamber within the sample flow path.
Figure 3:
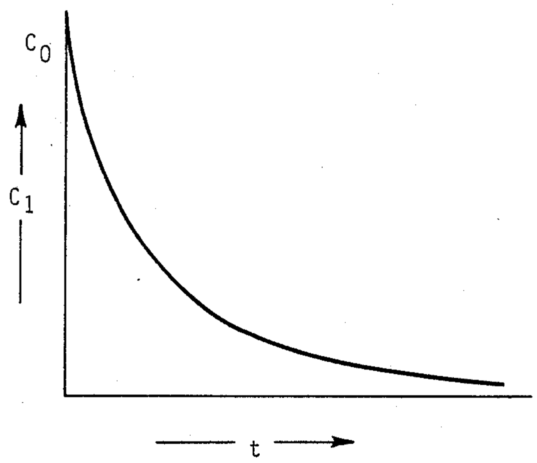
FIG. 3 is a time versus concentration curve for the sampling system shown in FIG. 2.
Figure 4:
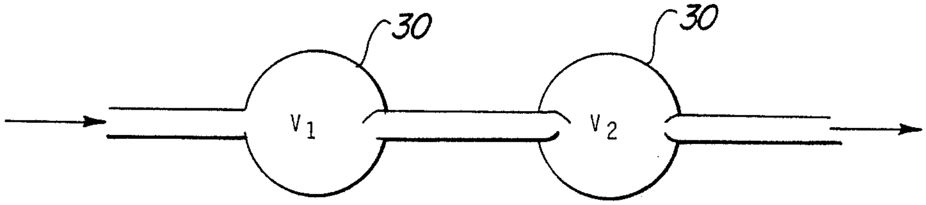
FIG. 4 is a simplified diagrammatic view of a mass spectrometer sampling system according to this invention which employs two chambers within the sample flow path.

FIGS. 2 through 4 are provided to illustrate the advantages of the use of a plurality of chambers 30 in accordance with this invention. FIG. 2 is a simplified depiction of the system shown in FIG. 1, but shown with only a single chamber 30. Those portions of the system shown in FIG. 2 which are identical to the system shown in FIG. 1 are identified by like reference numbers. In the system shown in FIG. 2, injector valve assembly 12 injects a sample into a carrier gas stream entering via inlet 28 which flows into chamber 30. Thereafter, the mixture is transmitted to molecular leak or membrane sampling device 36, and to vent outlet 38 and sample outlet 40 into a mass spectrometer.

The following equations provide a mathematical modeling of the system shown in FIG. 2. EQUATION 1 establishes the boundary conditions:

EQUATION (1)

$$t=0,\ C_0$$
$$t=t,\ C_1 \qquad (1)$$

where t is time $C_0$ is sample concentration at $t=0$ and $C_1$ is sample concentration at $t=t$ In expressing a material balance, we know that the accumulated material is the difference between material in and material out, or:

EQUATION (2)

$$0-fC_1=V(dC_1/dt) \qquad (2)$$

and by integration:

EQUATION (3)

$$\int_{C_0}^{C_1} d\ln C_1 = \int_0^t \frac{-f}{V}\, dt$$

and solving:

EQUATION (4)

$$C_1=C_0e^{-ft/v} \qquad (4)$$

This relationship is the well known exponential decay such as shown graphically in FIG. 3. This behavior is not ideal since the concentration decays exponentially.

FIG. 4 is a partial pictorial view of a sampling system including two separated volumes 30, designated as $V_1$ and $V_2$. A mathematical modeling of this system yields yields the following sample concentration relationship:

EQUATION (5)

$$C_2=2C_0(ft/V)e^{-ft/v} \qquad (5)$$

where $C_2$ is the concentration in $V_2$ at $t=t$

This relationship approaches a Gaussian curve rather than the exponential decay relationship of a single chamber system.

For a system having a number (n) of chambers 30, the mathematical modeling relationship is:

EQUATION (6)

$$C_n = \frac{n_0}{(n-1)!}\left(\frac{ft}{V}\right)^{n-1} e^{-ft/v}$$

and the maximum concentration ($C_{max}$) is:

EQUATION (7)

$$C_{max} = \frac{nC_0}{(n-1)!}(n-1)^{n-1} e^{-(n-1)}$$

which is independent of flow rate.

Figure 5:
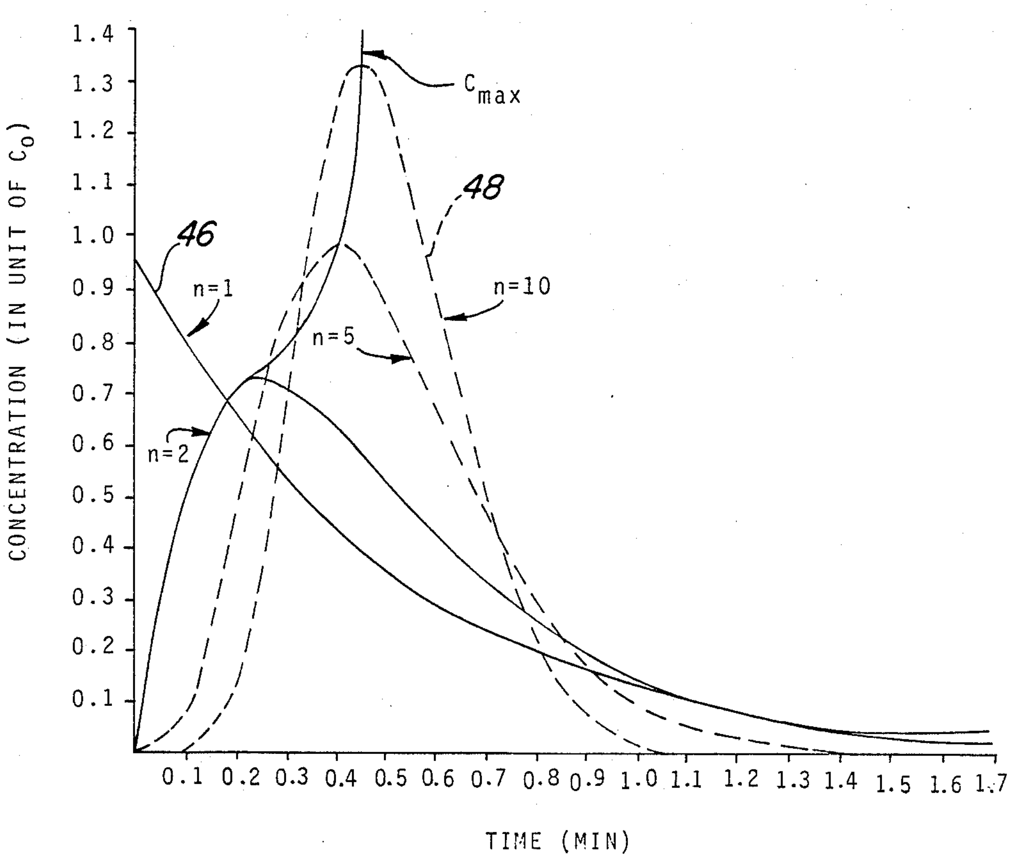
FIG. 5 is a time versus concentration relationship for exemplary sampling systems in accordance with this invention for various numbers of chambers with a fixed carrier gas flow rate.

FIG. 5 provides a graphical illustration of the influence of the number (n) of chambers 30 and a change in the time at which the peak sample concentration is measured for a given carrier gas flow rate. As is evident from that figure, an increase in the number of chambers 30 changes the concentration behavior from purely exponential decay, as designated by curve 46 for n=1, to a nearly Gaussian distribution for a system such as is shown in FIG. 1 as indicated by curve 48 for n=10. Such distribution enables the concentrations to be selected at various times to fit the requirements and operating parameters of the mass spectrometer being employed. Additionally, this behavior enables the system to operate continuously by taking samples at various times while the system is operating while maintaining a separation in these samplings. It is also evident that the vaporized liquid is cleared from the multi-chamber sample system (Curve 48) faster than the single chamber system (Curve 46) allowing a faster sample injection rate.

Figure 6:
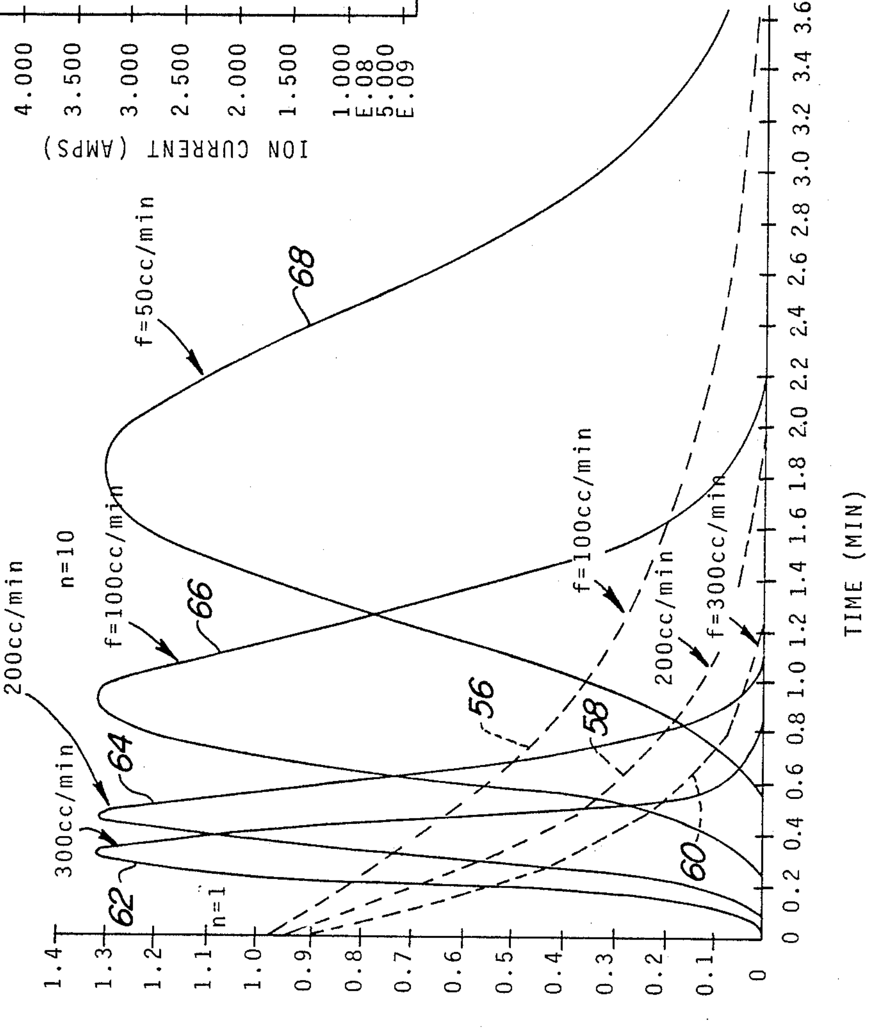
FIG. 6 is a time versus concentration relationship for an exemplary sampling system in accordance with this invention for various gas flow rates with a fixed number of chambers.

FIG. 6 is another time versus concentration distribution for a sampling system such as that shown in FIG. 1 in which ten chambers 30 are used, but showing the influence of varying flow rates of carrier gas. Curves 56, 58 and 60 represent the behavior of a system having a single mixing chamber 30 (n=1) at various flow rates, as indicated. Curves 62, 64, 66 and 68, however, are characteristic of a system employing ten consecutive chambers 30 (n=10). As is evident, increased flow does not change the peak sample concentration measured, but only changes the onset of such concentration peak with respect to time.

Figure 7:
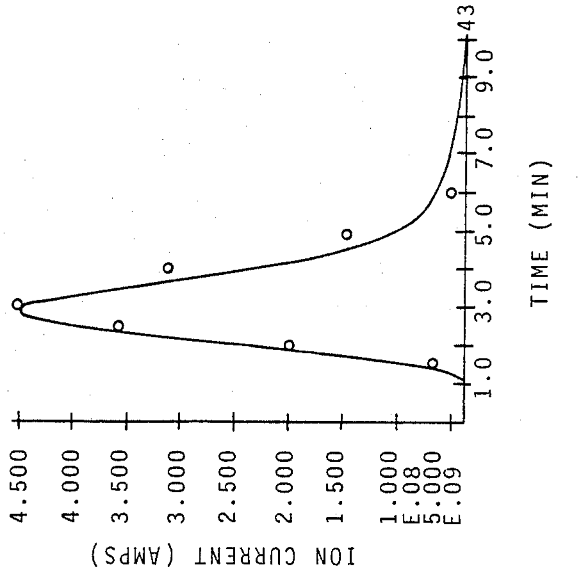
FIG. 7 shows the comparison of time versus concentration (expressed in ion current) relationship calculated from the derived equation (open circle) and obtained experimentally (solid curve) for an exemplary sampling system in accordance with this invention.

FIG. 7 provides a time versus concentration (expressed in terms of ion current) relationship for an experimental validation test that was conducted using the sampling system in accordance with this invention with ten consecutive chambers 30. The test was conducted using a mixture of 50% water and 50% acetone with a one microliter liquid injection sample and wherein the injector and oven temperature were at 200° C. The injection residence time was nine seconds, and the carrier gas (helium) flow rate was 28 cc's per minute. The solid lines of FIG. 7 is the empirically measured relationship, whereas the circled data points represent calculated values. This validation established the close correlation between experimental and calculated concentration values with respect to time. Although the FIGS. illustrate the use of chamber 30 having equal volumes, this invention could be also practiced using chambers having differing volumes. Additionally, while a spherical shape for the chambers 30 is preferred, other suitable shapes providing a confined volume may also be employed in the appropriate application.

Figure 8:
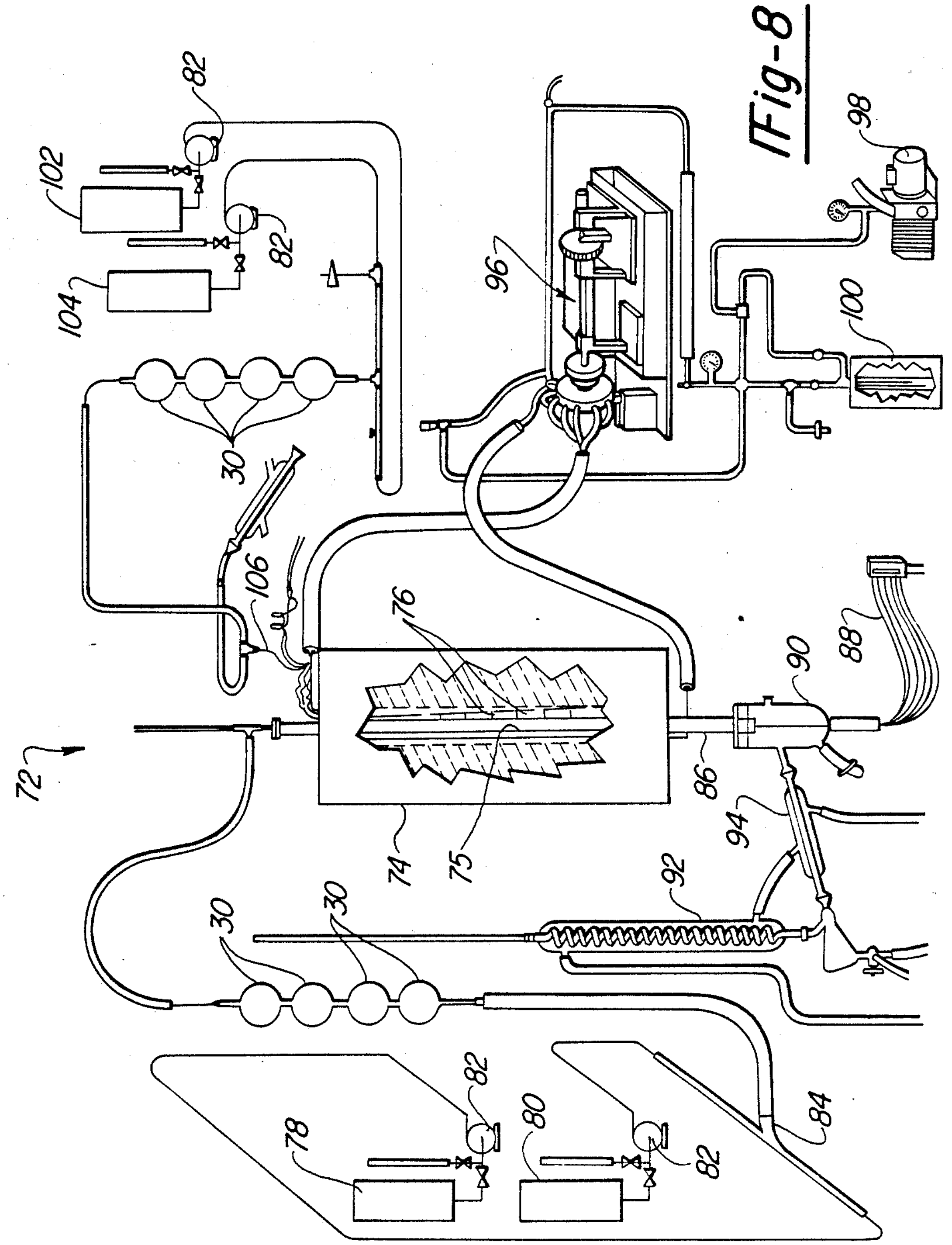
FIG. 8 is a pictorial view of a chemical reactor system employing a plurality of mixing chambers provided for thorough mixing of the reagents.

The use of a plurality of chambers 30 in accordance with this invention has been found to provide additional advantages besides controlling sample concentration behavior, as described previously. It has been found that such plurality of chambers 30 further provides excellent mixing of gaseous and/or vaporized reagents. FIG. 8 provides example apparatus 72 particularly adapted for the dehydrogenization reaction of ethyl benzene into styrene. The reaction occurs in a reactor 74 having an elongated reaction column 75 with a plurality of ports which communicate with tapping conduits 76. By providing conduits 76 at various points in reaction column 75, analysis of the reaction process at various stages of completion is possible. Tanks 78 and 80 are sources of water and ethyl benzene, respectively. Fluid pumps 82 are used to draw the reagents from tanks 78 and 80 which become initially mixed at junction 84. The combined fluids are thereafter conducted and vaporized through a plurality (four shown) of chambers 30 connected in series. The use of such a plurality of chambers 30 connected in series provides efficient and thorough mixing of the vaporized reagents. The vaporized reagents are thereafter introduced into reactor 74 where the styrene producing reaction occurs. The completed reagents exit reactor via discharge 86. Thermocoupled wires 88 are provided to enable monitoring of reaction stage temperatures. Receptacle 90 enables the discharged liquids and gases to be separated. Condensers 92 an 94 are provided to cool the discharged compounds. Tapping conduits 76 communicate with valve switcher apparatus 96. This device enables samples from each of the plurality of tapping conduits 76 to be communicated with a mass spectrometer analyzer. The samples are maintained at low pressure through the use of vacuum pump 98 with cold trap 100.

Apparatus 72 includes another series of components, including water tank 102 and tank 104 for an organic compound. These reagents are pumped by fluid pumps 82 and are thoroughly mixed through another series of mixing chambers 30 (four shown). These chambers again provide excellent mixing of these vaporized reagents. The fully vaporized and mixed reagents are thereafter conducted into the small capillary tube 106 which is conducted to valve switcher 96 for analysis. The auxiliary network including tanks 102 and 104 is provided to introduce samples of known compositions for the spectrometer calibration. Accordingly, another series of four chambers 30 are used to mix these known compositions.

In view of the foregoing, this inventor has found that the provision of a series of chambers 30 provides several advantages in mass spectrometric analysis including the modifying of concentration versus time relationship for a sample mixed with a gas, and further, as a means for thorough mixing of reagents.

While the above description constitutes the preferred embodiments of the present invention, it will be appreciated that the invention is susceptible to modification, variation, and change without departing from the proper scope and fair meaning of the accompanying claims.

I claim:

1. A sampling system for a mass spectrometer, comprising:

conveying means for providing a stream of a predetermined carrier gas;

valve means for injecting a fluid sample into said carrier gas stream at substantially atmospheric pressure;

chamber means for modifying the concentration of said sample in said carrier gas stream as a predetermined function of time, said chamber means comprising a plurality of discrete volumes maintained at substantially atmospheric pressure and connected in series such that the entire concentration of said sample passes through each of said discrete volumes; and sampling means, associated with the output of said chamber means, for introducing a portion of said sample in said carrier gas stream into a high vacuum fluid stream leading to said mass spectrometer.

2. A sampling system for a mass spectrometer according to claim 1, wherein said sample is a liquid and said sampling system further comprises heater means for vaporizing said liquid sample being introduced into said carrier gas stream.

3. A sampling system for a mass spectrometer according to claim 1, wherein said discrete volumes communicate by conduits which are small in relation to said discrete volumes.

4. A sampling system for a mass spectrometer according to claim 1, wherein said discrete volumes are generally spherical in shape having separated inlet and outlet ports.

5. A sampling system for a mass spectrometer according to claim 1, wherein said carrier gas is helium.

6. A sampling system for a mass spectrometer according to claim 1, further comprising means for introducing an additional stream of said carrier gas after said chamber means to reduce the concentration of said sample which reaches said sampling means.

7. A sampling system for a mass spectrometer according to claim 1, wherein said sampling means comprises a molecular leak.

8. A sampling system for a mass spectrometer according to claim 1, further comprising a temperature controlled oven, and wherein said chamber means and said sampling means are contained in said temperature controlled oven.

9. A liquid sampling system for a mass spectrometer, comprising:

carrier gas inlet means for introducing a carrier gas stream into said system;

injection valve means having a discharge cavity for depositing a predetermined quantity of said liquid sample into said carrier gas stream;

heater means for vaporizing said sample in said discharge cavity;

a plurality of discrete chambers maintained at substantially atmospheric pressure and connected in series by conduits which are small in relation to said chambers for modifying the concentration of said vaporized liquid sample in said carrier gas as a predetermined function of time; and sampling means associated with the output of said chambers for introducing a portion of said vaporized liquid sample into a high vacuum stream leading to said mass spectrometer.

10. A liquid sampling system for a mass spectrometer according to claim 9, wherein said chambers are generally spherical in shape with inlet and outlet ports on opposing sides of said chambers.

11. A liquid sampling system for a mass spectrometer according to claim 9, wherein said carrier gas is helium.

12. A liquid sampling system for a mass spectrometer according to claim 9, further comprising means for introducing an additional stream of said carrier gas after said chamber means to reduce the concentration of said sample which reaches said sampling means.

13. An apparatus for mixing a plurality of gases, comprising:

a plurality of mixing chambers operatively arranged in series and maintained at substantially atmospheric pressure to permit fluid flow through each of said mixing chambers without diversion, the first of said mixing chambers having inlet means for receiving said gases to be mixed, and the last of said mixing chambers having outlet means for discharging said mixed gases.

14. A method of introducing a fluid sample into a mass spectrometer, comprising the steps of:

injecting said fluid sample into a carrier gas stream;

passing the entire concentration of said fluid sample in said carrier gas stream through a plurality of series connected chambers and maintained at substantially atmospheric pressure for modifying the concentration of said sample in said carrier gas stream as a predetermined function of time such that the maximum concentration of said sample is substantially independent of the flow rate of said carrier gas stream; and introducing a portion of said sample in said carrier gas stream into a high vacuum fluid stream leading to said mass spectrometer.

15. A sampling system for a mass spectrometer according to claim 1, wherein said predetermined function enables the maximum concentration of said sample to be substantially independent of the flow rate of said carrier gas stream.

16. A sampling system for a mass spectrometer according to claim 15, wherein said chamber means modifies the concentration of said sample such that the concentration of said sample approaches a gaussian distribution with respect to time.

17. A sampling system for a mass spectrometer according to claim 16, wherein said chamber means includes at least four of said discrete volumes.

18. A liquid sampling system for a mass spectrometer according to claim 9, wherein said predetermined function enables the maximum concentration of said sample to be substantially independent of the flow rate of said carrier gas stream.

19. A liquid sampling system for a mass spectrometer according to claim 9, wherein said discrete chambers modify the concentration of said sample such that the concentration of said sample approaches a gaussian distribution with respect to time.

20. A liquid sampling system for a mass spectrometer according to claim 9, wherein said plurality of discrete chambers includes at least four of said discrete chambers.

* * * * *